United States Patent [19]

Tsuge et al.

[11] 4,323,205
[45] Apr. 6, 1982

[54] SAFETY SEAT-BELT RETRACTOR

[75] Inventors: Noboru Tsuge, Kariya; Satosi Kuwakado; Toshiaki Shimogawa, both of Aichi, all of Japan

[73] Assignee: Nippon Soken, Inc., Nishio, Japan

[21] Appl. No.: 163,265

[22] Filed: Jun. 26, 1980

[30] Foreign Application Priority Data

Jul. 19, 1979 [JP] Japan .......................... 54-100419[U]

[51] Int. Cl.³ ...................... A62B 35/02; B65H 75/48
[52] U.S. Cl. .............................. 242/107.4 A; 280/805; 297/472
[58] Field of Search ................. 242/107.4 R, 107.4 E; 280/801–808; 297/472, 471, 475–480

[56] References Cited

U.S. PATENT DOCUMENTS 3,561,690  2/1971  Muskat ........................... 280/805 X
3,666,198  5/1972  Neumann ...................... 242/107.4 B
4,273,361  6/1981  Takei et al. ........................ 280/805

FOREIGN PATENT DOCUMENTS 1913448  9/1970  Fed. Rep. of Germany ...... 280/805
50-100218  8/1975  Japan .
1335807  10/1973  United Kingdom ............... 280/805

Primary Examiner—John M. Jillions
Attorney, Agent, or Firm—Cushman, Darby & Cushman

[57] ABSTRACT

A safety seat-belt retractor for use in vehicles, comprising a fixed frame, a winding shaft rotatably mounted on the frame, and a toothed member mounted on the shaft for relative rotation thereto. A pawl is operative in response to a predetermined deceleration of a vehicle to lock the toothed member against rotation relative to the frame. A first projection and a second annular projection are formed on an axial end face of the toothed wheel with the first projection radially spaced from and positioned between the second annular projection and the shaft. An elongated energy-absorption member has one end thereof secured to the shaft and the other end free and extends between the shaft and the first projection, around the latter in U-shape and between the first and second projections. The elongated energy-absorption member is forcedly drawn by and wound around the shaft to absorb a tension on the seat-belt when the toothed member is locked by the pawl.

5 Claims, 6 Drawing Figures

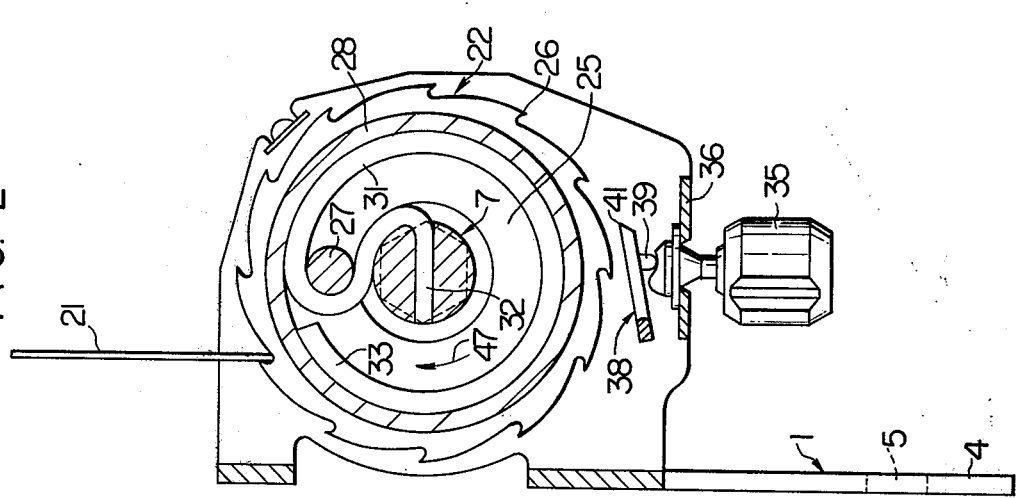
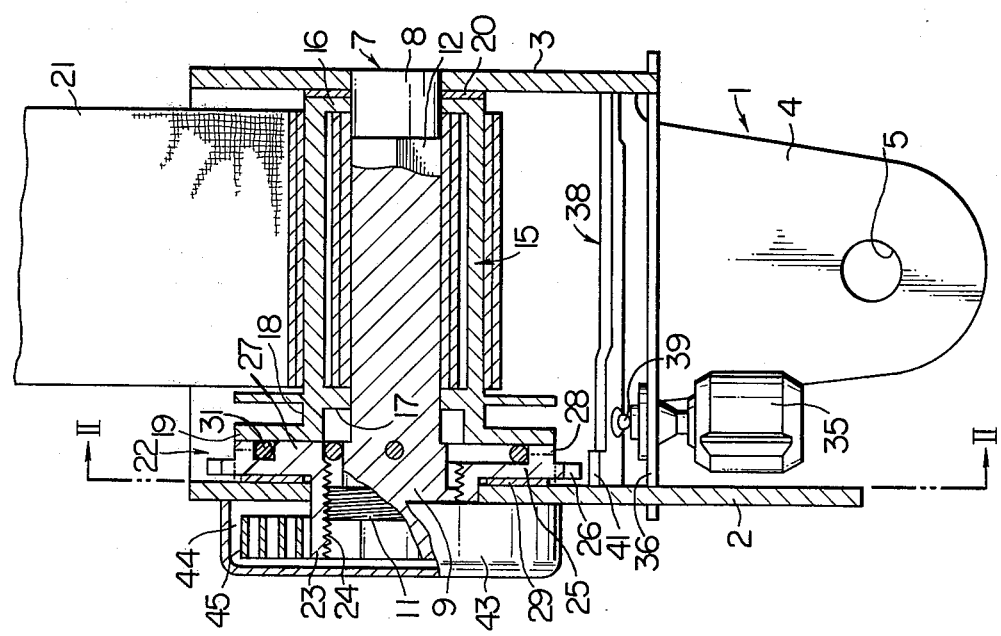

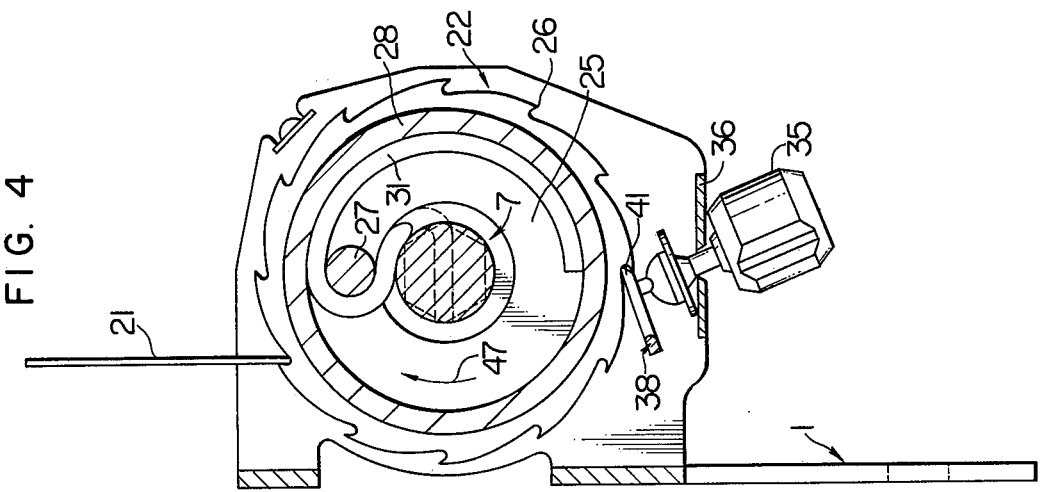
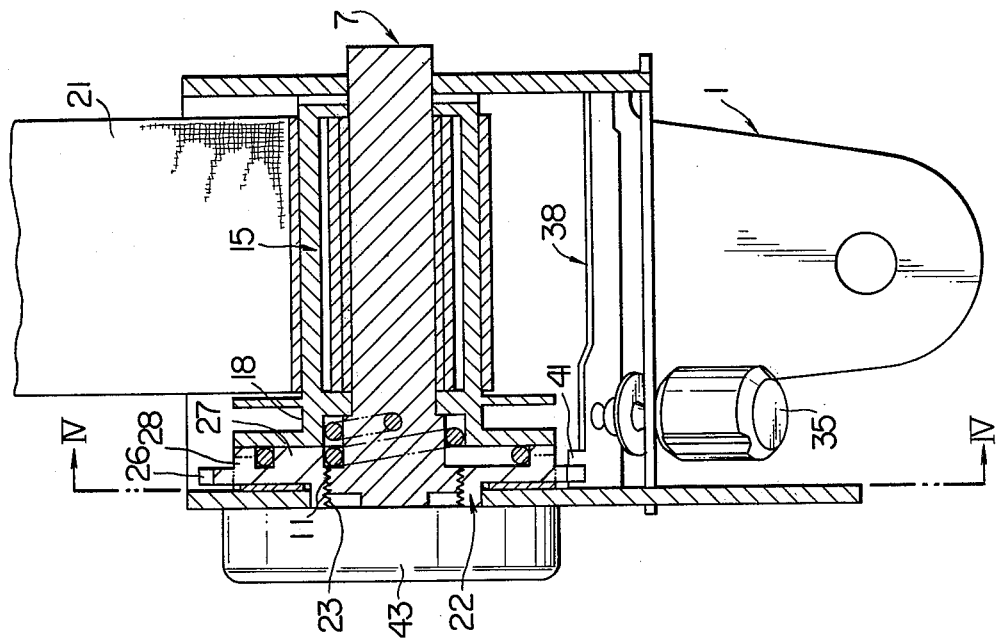

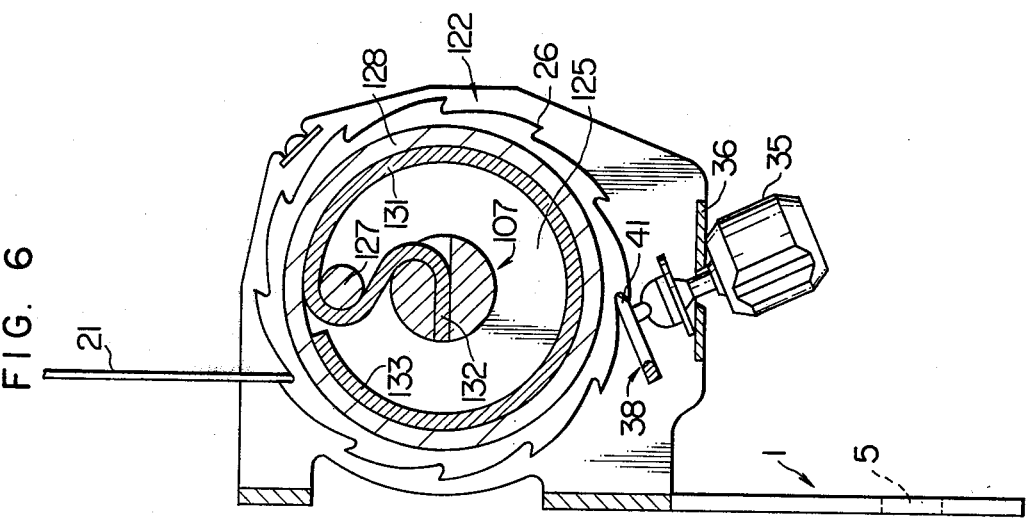
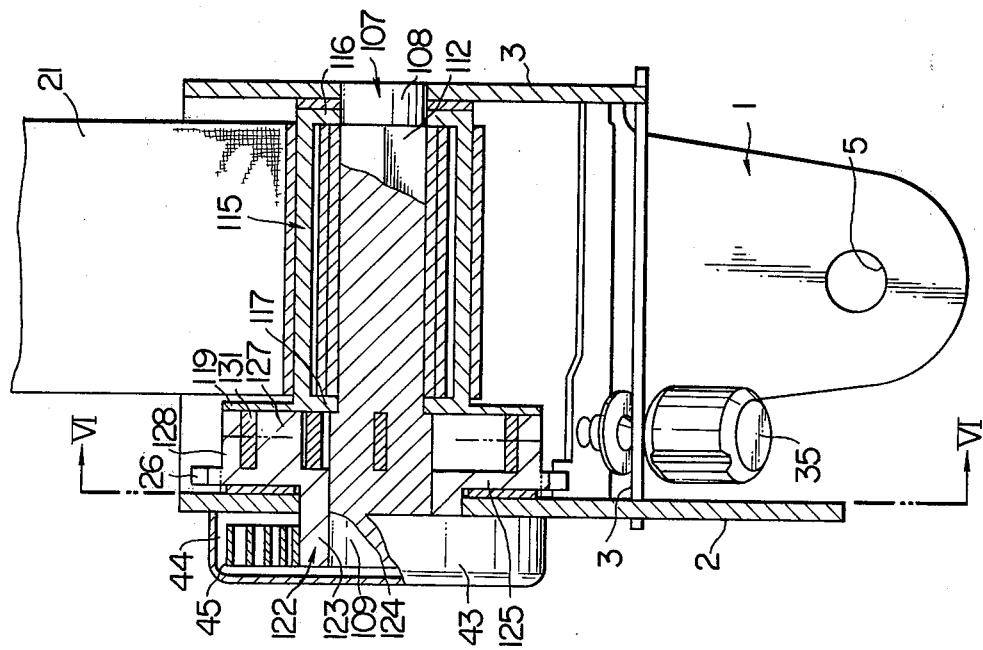

SAFETY SEAT-BELT RETRACTOR

BACKGROUND OF THE INVENTION

Field of the Invention

The present invention relates to an improvement in a safety seat-belt retractor for use in vehicles, and more particularly to an improvement in a safety seat-belt retractor including an elongated energy-absorption member which is forcedly drawn by and wound around a winding shaft to absorb a shock energy acting on a passenger upon occurrence of a predetermined deceleration of a vehicle such as upon the collision thereof.

A conventional safety seat-belt retractor of the kind described above, as is disclosed in Japanese Utility Model Laid-Open No. 100218/75, comprises a fixed frame, a winding shaft rotatably mounted on the frame, and a toothed member mounted on the winding shaft for relative rotation thereto. A seat-belt to be fitted on a passenger has one end secured to the shaft and is partly wound threaround. An elongated energy-absorption member has one end thereof secured to the shaft and the other end secured to the toothed member. The elongated energy-absorption member extends along a part of the outer circumferential surface of the shaft, is turned back and extends in roll around the shaft. Locking means comprising a pawl is operative in response to a predetermined deceleration of a vehicle, such as upon the collision thereof, to engage with the toothed member to lock the same against rotation relative to the fixed frame. When the toothed member is locked by the pawl, a tension on the seat-belt by a passenger causes the shaft to rotate relative to the toothed member so that the elongated energy-absorption member is forcedly drawn by and wound around the shaft to absorb a tension on the seat-belt, and hence a shock on the passenger.

However, in the arrangement of the conventional retractor discussed above, the radius with which the elongated energy-absorption member is turned back varies as it is wound around the shaft and is unstable. Thus, the energy absorbed by the elongated energy-absorption member, i.e., the tension on the seat-belt does also vary and fluctuate during the energy-absorption member is forcedly drawn by and wound around the shaft, and the varying shock energy acts on the passenger.

SUMMARY OF THE INVENTION

An object of the present invention is to provide an improvement in the safety seat-belt retractor, which can minimize the variation or fluctuation in tension acting on the seat-belt and absorbed by the elongated energy-absorption member, thereby to safely and gently protect a passenger from shock upon the occurrence of a predetermined deceleration of a vehicle.

According to the present invention, there is provided an improvement which comprises a projection on an axial end face of the toothed member and radially outwardly spaced from the winding shaft to define a first gap between the projection and the shaft; the elongated energy-absorption member having the other free end and extending through the first gap and around the projection in U-shape while engaging therewith; confining means radially outwardly spaced from the projection to define a second gap between the confining means and the projection, the confining means cooperating with the projection to confine the elongated energy-absorption member in the second gap so as to cause the elongated energy-absorption member to extend around the projection in U-shape having a constant radius; the elongated energy-absorption member having imparted thereto a resistance against being drawn when the winding shaft is rotated relative to the toothed member to draw the elongated energy-absorption member through the first and second gaps while maintaining the elongated energy-absorption member in U-shape having a constant radius around the projection by the confining means; and the elongated energy-absorption member being drawn through the first and second gaps by the winding shaft and wound therearound to absorb a tension on the seat-belt when the toothed member is locked against rotation relative to the fixed frame by the locking means and the tension on the seat-belt exceeds the resistance imparted to the elongated energy-absorption member.

BRIEF DESCRIPTIONS OF THE DRAWINGS

FIG. 1 is a vertical cross-sectional view showing an improved safety seat-belt retractor according to the present invention;

FIG. 2 is a sectional view taken along the line II—II of FIG. 1;

FIG. 3 is a vertical cross-sectional view similar to FIG. 1, but showing the safety seat-belt retractor upon a collision of a vehicle;

FIG. 4 is a sectional view taken along the line IV—IV of FIG. 3;

FIG. 5 is a vertical cross-sectional view similar to FIG. 1, but showing a second embodiment of the present invention; and FIG. 6 is a sectional view taken along the line VI—VI of FIG. 5.

DETAILED DESCRIPTION OF THE PREFERRED EMBODIMENTS

Referring to FIGS. 1 and 2, a safety seat-belt retractor for use in vehicles, according to the present invention comprises a fixed frame 1 which includes a pair of parallel side walls 2 and 3 and a rear wall 4 extending therebetween. The rear wall 4 has therein a hole 5 which is adapted to receive therein fastening means (not shown) such as a bolt to attach the retractor to a vehicle body (not shown).

A winding shaft 7 includes an axial one end portion 8 which has a circular cross-section and is rotatably fitted in a hole in the side wall 3, and the other axial end portion 9 which has a circular cross-section and has formed on the outer periphery with a thread 11. The shaft 7 further includes between the end portions 8 and 9 thereof an intermediate portion 12 having a polygonal or hexagonal cross-section. A cylindrical seat-belt reel 15 includes one axial end wall 16 having therein a circular hole in which the one axial end portion 8 of the shaft 7 is slidably and rotatably fitted and the other axial end wall 17 having therein a hexagonal hole in which the intermediate portion 12 of the shaft is slidably fitted, so that the reel 15 is mounted on the shaft 7 for rotation therewith, but the shaft is axially movable relative to the reel. The reel 15 further includes a tubular extension 18 axially projecting away from the end wall 17 and an end flange 19 on the free end of the tubular extension. A frictionless spacer ring 20 is positioned between the and wall 16 and the side wall 3 around the shaft 7. A seat-belt 21 for a passenger has one end thereof secured to the reel 15 and the other end having attached thereto an anchor or buckle (not shown), and is partly wound around the reel.

A toothed member 22 includes a cylindrical hub 23 having therethrough a threaded axial bore 24 with which the thread 11 on the other axial end portion 9 of the shaft 7 engages. The cylindrical hub 23 is rotatably fitted in a hole in the side wall 2 of the fixed frame 1. Thus, the toothed member 22 is mounted on the winding shaft 7 for relative rotation thereto through the threaded engagement between the threaded bore 24 and the thread 11 on the shaft 7. The shaft 7 is rotatably mounted on the fixed frame 1 through the cylindrical hub 23 of the toothed member 22 and is axially movable relative thereto upon the rotation of the shaft 7 relative to the toothed member 22. The toothed member 22 further includes a disc 25 integrally mounted on the hub 23 and formed with unidirectional teeth 26 on the outer circumferential surface of the disc. A projection 27 having a circular cross-section is integrally formed on an axial end face of the disc 25 and is radially outwardly spaced from the shaft 7 to define a gap between the projection and the shaft. The projection 27 axially projects from the axial end face of the disc 25 toward the reel 15 and abuts against the end flange 19 of the reel. An annular projection 28 is integrally formed on the axial end face of the disc 25 in a concentric relation thereto and to the shaft 7 and is radially outwardly spaced from the projection 27 to define a gap between the projection 27 and the annular projection 28. The annular projection 28 axially projects toward the end flange 19 of the reel 15 and abuts against the flange. A frictionless spacer ring 29 is disposed between the disc 25 and the side wall 2 of the fixed frame 1 around the cylindrical hub 23.

An elongated energy-absorption member or metal wire 31 has one end 32 thereof inserted into a radial bore in the shaft 7 and secured thereto, and the other free end 33. The metal wire 31 extends through the gap between the projection 27 and the shaft 7, around the projection 27 in U-shape, through the gap between the projection 27 and the annular projection 28, and along the inner periphery of the latter. The metal wire 31 extends in U-shape around the projection 27 and frictionally engages therewith and with the inner periphery of the annular projection 28. The annular projection 28 cooperates with the projection 27 to confine the metal wire 31 in the gap between the projections 27 and 28 so as to cause the metal wire to extend around the projection 27 in U-shape having a constant radius determined by the diameter of the projection 27. Thus, a resistance against being drawn is imparted to the metal wire when the shaft 7 is rotated in the direction 47 relative to the toothed member 22 to forcedly draw the metal wire through the gaps between the shaft and the projection 27 and between the latter and the annular projection 28 while maintaining the metal wire in U-shape having a constant radius around the projection 27 by the annular projection 28.

The resistance imparted to the metal wire 31 mainly depends on the bending characteristics of the metal wire, which in turn depend on the material and cross-sectional area of the metal wire, and the bending radius with which the metal wire extends in U-shape around the projection 27, i.e., the diameter thereof. Thus, the resistance imparted to the metal wire is adjustable by the appropriate selection of the material and cross-sectional area of the metal wire and the diameter of the projection 27. Energy absorbed by the metal wire 31 is adjustable by the cross-sectional area of the metal wire.

A pendulum 35 is pivotably supported by a bracket plate 36 extending between and secured to the side walls 2 and 3 of the fixed frame 1, and is pivotable or swingable in response to a change in acceleration and deceleration of a vehicle. A pawl member 38 extends between and pivotably supported by the side walls 2 and 3 and has a projection 39 downwardly projecting from the lower surface of the pawl member 38 and engaging with the top of the pendulum 35. A tooth 41 is formed on the pawl member 38. The pawl member is swingable in response to the swinging movement of the pendulum 35 between a normal position shown in FIGS. 1 and 2 where the tooth 41 is disengaged from one of the teeth 26 on the disc 25 of the toothed member 22 and a position shown in FIGS. 3 and 4 where the tooth 41 engages with one of the teeth 26 to lock the toothed member 22 against rotation relative to the fixed frame 1 when the pendulum is tilted or swung in response to a predetermined deceleration of a vehicle, for example, upon the collision thereof.

A cup-shaped member 43 is mounted on and cooperates with the side wall 2 of the fixed frame 1 to define therebetween a chamber 44 receiving therein the ends of the toothed member 22 and the shaft 7. A spirally wound spring 45 is disposed within the chamber 44 and has one end secured to the cylindrical hub 23 of the toothed member 22 and the other end secured to the inner surface of the cup-shaped member 43.

In operation, when the vehicle runs under normal condition where the deceleration of the vehicle is less than a predetermined value, the pendulum 35 is substantially maintained in its position shown in FIGS. 1 and 2 where it depends substantially vertically from the bracket plate 36, although the pendulum more or less swings in response to change in acceleration and deceleration of a vehicle, so that the pawl member 38 is maintained in its position where tooth 41 thereon is disengaged from one of the teeth 26 on the disc 25 of the toothed member 22. Under the normal condition, as the seat-belt 21 is pulled and wound off the reel 15, the reel and the shaft 7 are rotated together in the direction shown by an arrow 47 in FIG. 2. If the pulling force on the seat-belt 21 is equal to or less than the resistance imparted to the metal wire 31, the rotation of the shaft 7 is transmitted through a substantially rigid connection between the projection 27 and the shaft 7 by the metal wire 31 to the toothed member 22 to rotate the same against the biasing force of the spring 45. When the pulling force on the seat-belt 21 is released, the energy stored in the spring 45 tends to return it to its original position and causes the toother member 22 and the shaft 7 connected thereto through the substantially rigid connection to be rotated to wind the seat-belt 21 around reel 15.

When the pendulum 35 is swung in response to a predetermined deceleration of the vehicle such as upon the collision thereof to swing the pawl member 38 upwardly, as shown in FIGS. 3 and 4, the tooth 41 on the pawl member 38 engages with one of the teeth 26 on the disc 25 of the toothed member 22, so that the toothed member 22 is locked against rotation relative to the fixed frame 1. Under this condition, a tension is applied to the seat-belt 21 due to inertia of a passenger having fitted thereon the seat-belt, and the seat-belt tends to be wound out of the reel 15. If the tension on the seat-belt is equal to or less than the resistance imparted to the metal wire 31, the tension on the seat-belt does not allow the shaft 7 to be rotated, because the shaft is connected through the rigid connection between the shaft and the projection 27 by the wire 31 to the toothed member 22 which is locked against rotation relative to the fixed frame 1 by the pawl member 38, so that the passenger is restrained by the seat-belt 21.

If the tension on the seat-belt due to inertia of a passenger upon a predetermined deceleration of a vehicle exceeds the resistance imparted to the metal wire 31, the tension causes the shaft 7 to be rotated relative to the toothed member 22 which is locked against rotation by the pawl member 38, and causes the metal wire 31 to be forcedly drawn by the shaft 7 around the projection 27 while being maintained in U-shape therearound by the annular projection 28 and to be wound around the shaft 7, as shown in FIGS. 3 and 4, to effectively absorb the tension on the seat-belt 21 and to relief the shock on the passenger, so that he is safely and gently restrained by the seat-belt. The rotation of the shaft 7 relative to the toothed member 22 also causes the shaft to axially move relative to the toothed member because of the threaded engagement between the threaded bore 23 in the toothed member and the thread 11 on the shaft 7, so that the metal wire 31 is wound around the shaft in a helical manner without having overlapped turns of the metal wire, and is advanced into an annular gap defined between the shaft 7 and the annular extension 18 of the reel 15, as clearly seen from FIG. 3.

FIGS. 5 and 6 illustrate a safety seat-belt retractor comprising another embodiment of the present invention. In FIGS. 5 and 6, the same reference numerals are respectively applied to parts and elements common to the embodiment shown in FIGS. 1 and 2, and the description with reference to the common parts and elements will be omitted. A shaft 107 includes one axial end portion 108 having a circular cross-section and rotatably fitted in a hole in a side wall 3 of a fixed frame 1, and the other axial end portion 109 having a circular cross-section. An intermediate portion 112 between the end portions 108 and 109 of the shaft 107 has a hexagonal cross-section. A cylindrical seat-belt reel 115 includes one axial end wall 116 having therein a circular hole in which the one axial end portion 108 is rotatably fitted, and the other axial end wall 117 having therein a hexagonal hole in which the intermediate portion 112 of the shaft 107 is fitted. An end flange 119 is provided around the other end wall 117 of the reel 115.

A toothed member 122 includes a cylindrical hub 123 having therethrough an axial bore 124 in which the other end portion 109 of the shaft 107 is rotatably fitted. The cylindrical hub 123 is rotatably fitted in a hole in the side wall 2 of the fixed frame 1. The toothed member 122 further includes a disc 125, a projection 127 and an annular projection 128, respectively similar to the disc 25, the projection 27 and the annular projection 28 in the embodiment illustrated in FIGS. 1 and 2. An elongated energy-absorption member or steel belt 131 has one end 132 thereof inserted into a radial bore in the shaft 107 and secured thereto, and the other free end 133. The steel belt 131 extends through a gap between the shaft 107 and the projection 127, around the latter in U-shape, through a gap between the projection 127 and the annular projection 128, and along the inner periphery of the latter.

In operation of the embodiment shown in FIGS. 5 and 6 is substantially the same as that of the embodiment shown in FIGS. 1 and 2 except that in the embodiment in FIGS. 5 and 6, the shaft 107 does not axially move relative to the toothed member 122, and the elongated energy-absorption member 131 is wound around the shaft 107 in a roll manner, when the shaft is rotated relative to the toothed member 122.

As will be obvious to one skilled in the art, the annular projection 28, 128 is not necessarily formed on the axial end face of the disc 25, 125 of the toothed member 22, 122 in an integral relation thereto, but may be integrally formed on the axial end face of flange 19, 119 of the reel 15, 115 facing to the toothed member 22, 122.

As described above, the present invention is arranged such that the annular projection 28, 128 cooperates with the projection 27, 127 to confine the elongated energy-absorption member 31, 131 in the gap between the projections 27, 127 and 28, 128 so as to cause the elongated energy-absorption member to extend around the projection 27, 127 in U-shape having always a constant radius determined by the diameter of the projection 27, 127. With the arrangement of the present invention, a tension on the seat-belt 21 can be absorbed by the elongated energy-asorption member in a stable and constant manner during the time the elongated energy-absorption member is forcedly drawn by and wound around the shaft 7, 107, and the passenger can be safely and gently protected from a shock upon an abrupt deceleration of a vehicle, such as upon collision thereof.

What we claim is:

1. In a retractor for safety seat-belt to be fitted on a passenger, for use in vehicles, comprising:
    a fixed frame;
    a winding shaft rotatably mounted on said frame, said seat-belt having one end thereof secured to said shaft and partly wound therearound;
    a toothed member mounted on said winding shaft for relative rotation thereto;
    locking means operative in response to a predetermined deceleration of a vehicle to engage with said toothed member for locking the same against rotation relative to said fixed frame; and
    an elongated energy-absorption member having one end thereof secured to said winding shaft,
    the improvement which comprises:
    a projection on an axial end face of said toothed member and radially outwardly spaced from said winding shaft to define a first gap between said projection and said shaft;
    said elongated energy-absorption member having the other end free and extending through said first gap and around said projection in U-shape engaging therewith;
    confining means spaced radially outwardly from said projection to define a second gap between said confining means and said projection, said confining means cooperating with said projection to confine said elongated energy-absorption member in said second gap so as to cause said elongated energy-absorption member to extend around said projection in U-shape having a constant radius;
    said elongated energy-absorption member having imparted thereto a resistance against being drawn when said winding shaft is rotated relative to said toothed member to draw said elongated energy-absorption member through said first and second gaps while maintaining said elongated energy-absorption member in U-shape having a constant radius around said projection by said confining means; and said elongated energy-absorption member being drawn through said first and second gaps by said winding shaft and wound therearound to absorb a tension on said seat-belt when said toothed member is locked against rotation relative to said fixed frame by said locking means and the tension on said seat-belt exceeds said resistance imparted to said elongated energy-absorption member, wherein said elongated energy-absorption member has a circular cross-section and has a free end portion extending around said shaft between the same and said confining means, and wherein said winding shaft is axially movably mounted on said fixed frame and has a threaded portion, and said toothed member has a threaded portion threadedly engaging with said threaded portion on said winding shaft, said winding shaft being axially movable relative to said toothed member upon the rotation of said winding shaft relative to said toothed member when said toothed member is locked against rotation by said locking means and the tension on said seat-belt exceeds said resistance imparted to said elongated energy-absorption member.

2. A retractor claimed in claim 1, further comprising spring means associated with said toothed member and biasing the same in the direction in which said seat-belt is wound around said winding shaft, said spring means storing its energy upon the winding of said seat-belt out of said winding shaft when said toothed member is unlocked from said locking means and the tension on said seat-belt is at most equal to said resistance imparted to said elongated energy-absorption member, and said spring means being returned to its original position upon the release of the tension from said seat-belt to wind said seat-belt around said winding shaft.

3. A retractor claimed in claim 1, wherein said elongated energy-absorption member comprises a metal wire having a circular cross-section.

4. In a retractor for safety seat-belt to be fitted on a passenger, for use in vehicles, comprising:
a fixed frame;
a winding shaft rotatably mounted on said frame, said seat-belt having one end thereof secured to said shaft and partly wound therearound;
a toothed member mounted on said winding shaft for relative rotation thereto;
locking means operative in response to a predetermined deceleration of a vehicle to engage with said toothed member for locking the same against rotation relative to said fixed frame; and
an elongated energy-absorption member having one end thereof secured to said winding shaft,
the improvement which comprises:
a projection on an axial end face of said toothed member and radially outwardly spaced from said winding shaft to define a first gap between said projection and said shaft;
said elongated energy-absorption member having the other end free and extending through said first gap and around said projection in U-shape while engaging therewith;
confining means spaced radially outwardly from said projection to define a second gap between said confining means and said projection, said confining means cooperating with said projection to confine said elongated energy-absorption member in said second gap so as to cause said elongated energy-absorption member to extend around said projection in U-shape having a constant radius;

said elongated energy-absorption member having imparted thereto a resistance against being drawn when said winding shaft is rotated relative to said toothed member to draw said elongated energy-absorption member through said first and second gaps while maintaining said elongated energy-absorption member in U-shape having a constant radius around said projection by said confining means; and said elongated energy-absorption member being drawn through said first and second gaps by said winding shaft and wound therearound to absorb a tension on said seat-belt when said toothed member is locked against rotation relative to said fixed frame by said locking means and the tension on said seat-belt exceeds said resistance imparted to said elongated energy-absorption member, wherein said projection is formed integrally on the one axial end face of said toothed member and has a circular cross-section, wherein said elongated energy-absorption member has a circular cross-section and has a free end portion extending around said shaft between the same and said confining means, and wherein said winding shaft is axially movably mounted on said fixed frame and has a threaded portion, and said toothed member has a threaded portion threadedly engaging with said threaded portion on said winding shaft, said winding shaft being axially movable relative to said toothed member upon the rotation of said winding shaft relative to said toothed member when said toothed member is locked against rotation by said locking means and the tension on said seat-belt exceeds said resistance imparted to said elongated energy-absorption member.

5. In a retractor for safety seat-belt to be fitted on a passenger, for use in vehicles, comprising:
a fixed frame;
a winding shaft rotatably mounted on said frame, said seat-belt having one end thereof secured to said shaft and partly wound therearound;
a toothed member mounted on said winding shaft for relative rotation thereto;
locking means operative in response to a predetermined deceleration of a vehicle to engage with said toothed member for locking the same against rotation relative to said fixed frame; and
an elongated energy-absorption member having one end thereof secured to said winding shaft;
the improvement which comprises:
a projection on an axial end face of said toothed member and radially outwardly spaced from said winding shaft to define a first gap between said projection and said shaft;
said elongated energy-absorption member having the other end free and extending through said first gap and around said projection in U-shape while engaging therewith;
confining means spaced radially outwardly from said projection to define a second gap between said confining means and said projection, said confining means cooperating with said projection to confine said elongated energy-absorption member in said second gap so as to cause said elongated energy-absorption member to extend around said projection in U-shape having a constant radius;

said elongated energy-absorption member having imparted thereto a resistance against being drawn when said winding shaft is rotated relative to said toothed member to draw said elongated energy-absorption member through said first and second gaps while maintaining said elongated energy-absorption member in U-shape having a constant radius around said projection by said confining means; and said elongated energy-absorption member being drawn through said first and second gaps by said winding shaft and wound therearound to absorb a tension on said seat-belt when said toothed member is locked against rotation relative to said fixed frame by said locking means and the tension on said seat-belt exceeds said resistance imparted to said elongated energy-absorption member, wherein said projection is formed integrally on the one axial end face of said toothed member and has a circular cross-section, wherein said confining means comprises an annular projection formed integrally on the one axial end face of said toothed member in a concentric relation thereto and to said winding shaft, wherein said elongated energy-absorption member has a circular cross-section and has a free end portion extending around said shaft between the same and said confining means, and wherein said winding shaft is axially movably mounted on said fixed frame and has a threaded portion, and said toothed member has a threaded portion threadedly engaging with said threaded portion on said winding shaft, said winding shaft being axially movable relative to said toothed member upon the rotation of said winding shaft relative to said toothed member when said toothed member is locked against rotation by said locking means and the tension on said seat-belt exceeds said resistance imparted to said elongated energy-absorption member.

* * * * *